United States Patent
Crombez et al.

(10) Patent No.: US 8,554,419 B2
(45) Date of Patent: Oct. 8, 2013

(54) CONTROL OF A VEHICLE POWERTRAIN IN RESPONSE TO BRAKE PEDAL INPUT

(75) Inventors: Dale Scott Crombez, Livonia, MI (US); Moses Alexander Fridman, Birmingham, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 12/790,085

(22) Filed: May 28, 2010

(65) Prior Publication Data

US 2011/0295468 A1 Dec. 1, 2011

(51) Int. Cl.
G06F 7/00 (2006.01)
G06F 17/00 (2006.01)
B60W 10/18 (2012.01)

(52) U.S. Cl.
CPC . *G06F 7/00* (2013.01); *G06F 17/00* (2013.01); *B60W 10/18* (2013.01)
USPC .............. 701/48; 477/182; 180/282

(58) Field of Classification Search
USPC ............ 701/48, 84; 477/182, 186, 209–212; 180/282, 197; 303/141
See application file for complete search history.

(56) References Cited

U.S. PATENT DOCUMENTS

| | | | |
|---|---|---|---|
| 6,125,315 A * | 9/2000 | Kon et al. | 701/54 |
| 6,186,253 B1 | 2/2001 | Barnhart et al. | |
| 6,278,916 B1 | 8/2001 | Crombez | |
| 6,480,779 B2 * | 11/2002 | Mardberg | 701/70 |
| 6,881,174 B2 * | 4/2005 | McCall | 477/107 |
| 7,771,312 B2 * | 8/2010 | Sigmund | 477/107 |
| 7,894,968 B2 * | 2/2011 | Stroh et al. | 701/84 |
| 2008/0228369 A1 | 9/2008 | Stroh et al. | |
| 2008/0288150 A1 | 11/2008 | Isogai et al. | |
| 2010/0036566 A1 * | 2/2010 | Hayami | 701/48 |
| 2012/0116650 A1 * | 5/2012 | Miyazaki et al. | 701/102 |

FOREIGN PATENT DOCUMENTS

| | | |
|---|---|---|
| EP | 0952029 A2 | 10/1999 |
| GB | 2325060 A | 11/1998 |
| GB | 2392512 A | 3/2004 |
| JP | 2005291030 A * | 10/2005 |

OTHER PUBLICATIONS http://www.detnews.com/article/20100405/AUTO01/4050372/1361/rss41, GM to Install Brake-Override Systems in New Vehicles, Apr. 5, 2010, pp. 1-2.

* cited by examiner

*Primary Examiner* — Thomas Tarcza
*Assistant Examiner* — Tyler J Lee
(74) *Attorney, Agent, or Firm* — Raymond L. Coppiellie; Brooks Kushman P.C.

(57) ABSTRACT

In the event that the brake pedal and accelerator pedal are depressed simultaneously, powertrain output is decreased monotonically with brake pedal input. In a lower range of brake pedal input, the brakes are prevented from actuating or are allowed to actuate minimally. In a higher range of pedal input, the powertrain output continues to be decreased and the brakes are allowed to actuate. In yet another higher range of pedal input, the powertrain output is substantially decreased such that a minimal powertrain output is achieved. The powertrain may include an internal combustion engine and/or an electric motor. The brake pedal input is determined based on a sensor associated with the brake pedal, the brake booster, or the master cylinder.

15 Claims, 4 Drawing Sheets

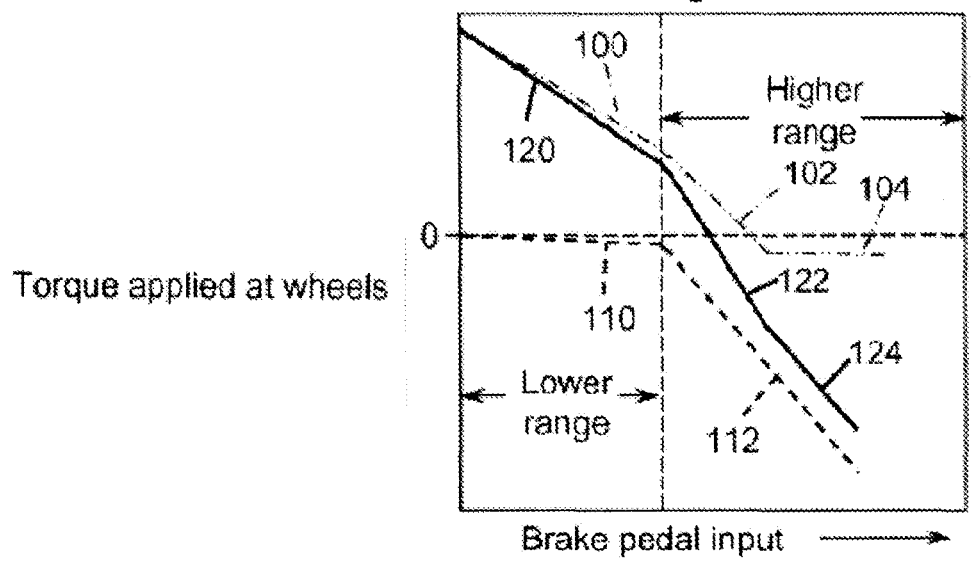
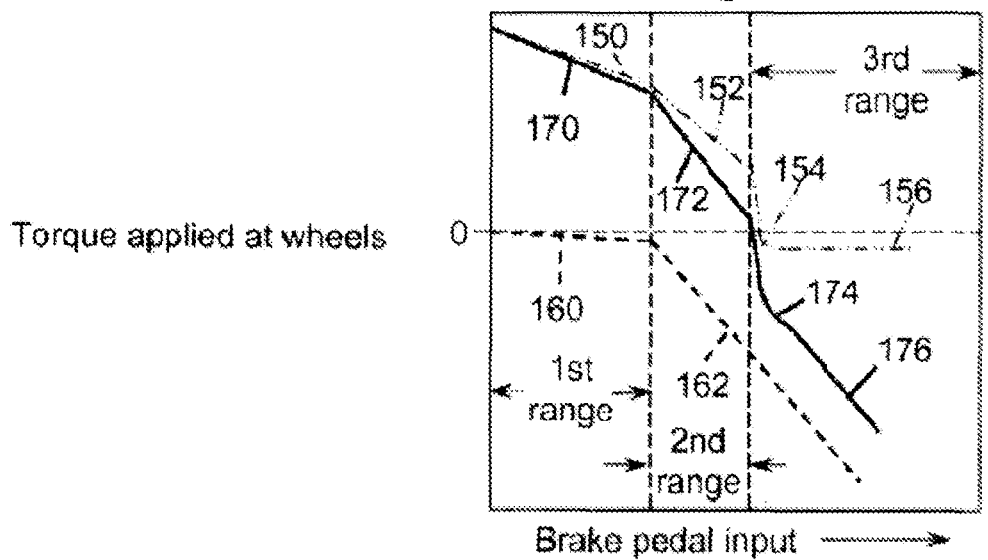

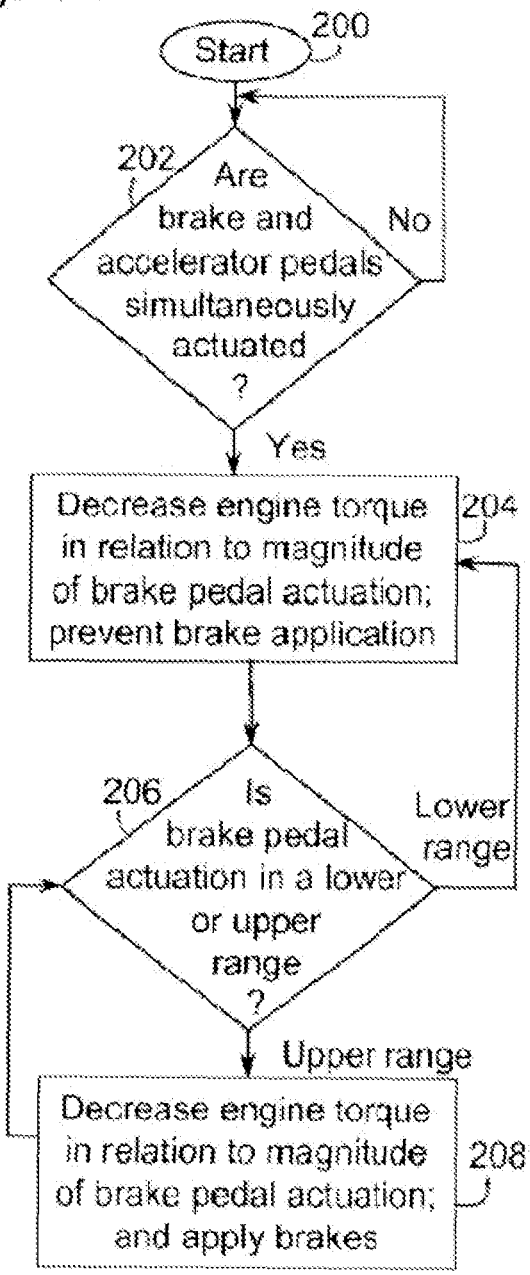

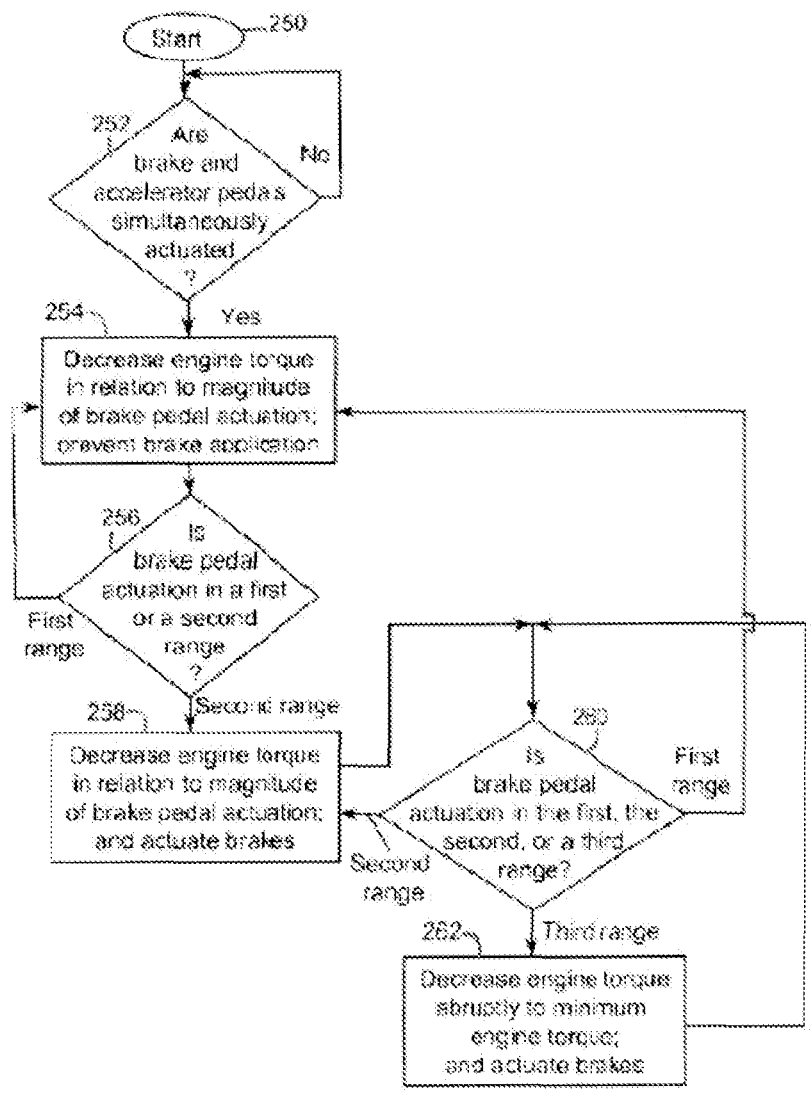

CONTROL OF A VEHICLE POWERTRAIN IN RESPONSE TO BRAKE PEDAL INPUT

BACKGROUND

1. Technical Field

The present disclosure relates to a system and method to control output supplied by a powertrain to vehicle wheels in the event of detection of simultaneous inputs to the brake and accelerator pedals.

2. Background Art

In some circumstances, an input to an accelerator pedal and a brake pedal are detected simultaneously. If brakes are applied, while the engine is supplying positive output to vehicle wheels, the brakes can overheat and prematurely wear out.

SUMMARY

To overcome at least one problem in the background art, a method is disclosed for controlling a vehicle having a powertrain, which may include an internal combustion engine, including detecting a first condition when a brake input and an accelerator input occur simultaneously, determining a magnitude of the brake input, and commanding the engine to decrease engine torque output in accordance with the magnitude of the brake input when the condition is detected.

Also disclosed is a system for controlling engine torque provided to wheels of an automotive vehicle, including: an internal combustion engine coupled to a first axle of the vehicle, brakes coupled to vehicle wheels, a brake pedal coupled to the brakes, and a brake sensor coupled to the brake pedal to detect operator input to the brake pedal. The vehicle is also provided with an accelerator pedal and an accelerator pedal position sensor. An electronic control unit (ECU) is electronically coupled to the engine, the accelerator pedal position sensor and the brake sensor. The ECU monotonically decreases output supplied by the engine as brake pedal input increases when the accelerator pedal is also being actuated. In one embodiment, the brake sensor is an angle or position sensor directly or indirectly coupled to a brake pedal. In another embodiment, the brake sensor is a pressure sensor coupled to the hydraulics of the brake system. In yet another embodiment, the brake sensor is a force sensor coupled to a brake pedal. In one embodiment, engine output is decreased when both pedals are actuated simultaneously with the engine output decrease based on the magnitude of the brake pedal actuation and independent of the accelerator pedal position magnitude. Brake pedal actuation has a lower range in which engine output decrease is affected and the brakes are prevented from being actuated. In an upper range of brake pedal actuation, the engine output is further decreased and the brakes are actuated. In yet another embodiment, brake pedal actuation has three ranges: 1) engine output is decreased in response to brake pedal input and the brakes are largely prevented from actuation; 2) engine output is decreased in response to brake pedal input and the brakes are actuated; and 3) engine output is decreased to its lowest level and brakes are actuated.

In one embodiment, decrease in powertrain output when the brake and accelerator pedals are simultaneously actuated occurs only when vehicle speed is above a threshold speed.

BRIEF DESCRIPTION OF THE DRAWINGS

FIGS. 2 and 3 are a plots of output applied at the driven wheels as a function of brake input according to a two-range and a three-range embodiment of the disclosure, respectively; and FIGS. 4-5 are flowcharts of methods according to embodiments of the disclosure.

DETAILED DESCRIPTION

Figure 1:
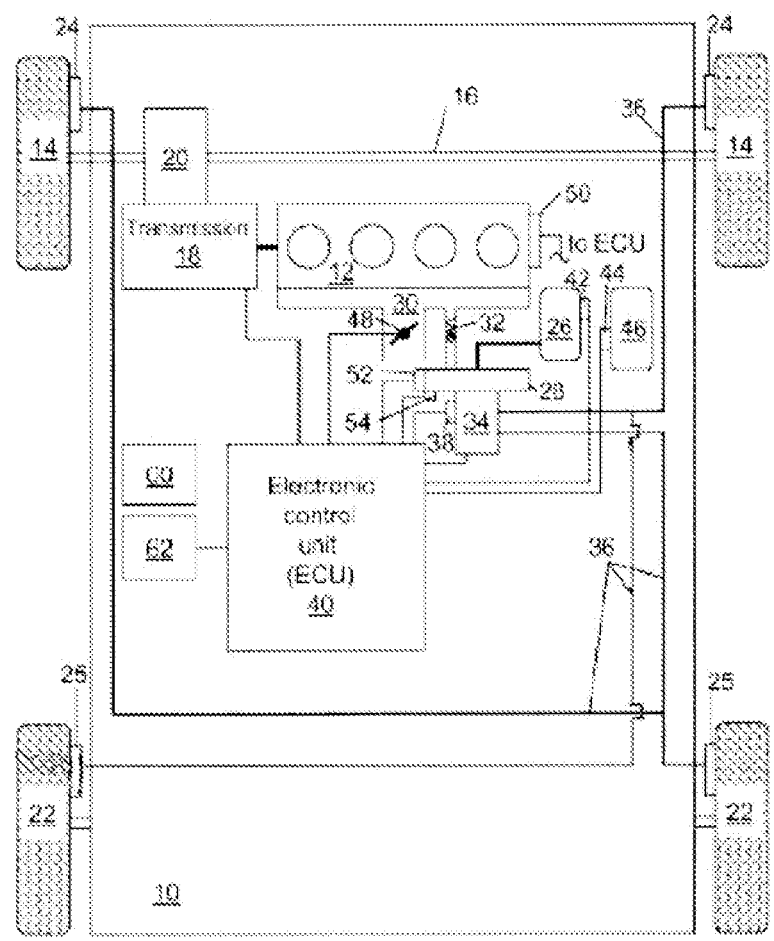
FIG. 1 is a schematic of a vehicle according to an embodiment of the disclosure.

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components or processes are arranged in a slightly different order than shown in the embodiments in the Figures. Those of ordinary skill in the art will recognize that the teachings of the present disclosure may be applied to other applications or implementations.

In FIG. 1, a vehicle 10 is shown that is powered by an internal combustion engine 12. Engine 12 drives wheels 14 of an axle 16 through a transmission 18 and differential 20. Each of the driven wheels 14 and non-driven wheels 22 are provided with brakes 24, 25, respectively. Actuation of brakes 24, 25 is initiated by an operator of vehicle 10 depressing a brake pedal 26. A force applied by the vehicle operator is amplified via a brake booster 28, Brake booster is supplied manifold vacuum from an intake manifold 30 coupled to engine 12. A check valve 32 is provided in between brake booster 28 and intake manifold 30 so that when manifold vacuum in intake manifold 30 drops below that which exists in brake booster 28, check valve 32 closes to maintain the vacuum existing in brake booster 28. Brake booster 28 acts upon master cylinder 34 to pressurize fluid within. The pressurized fluid is supplied to brakes 24 through hydraulic lines 36. In some embodiments, a pressure sensor 38 is coupled to master cylinder 34 to provide an indication of a magnitude of brake pedal input. In other alternatives, pressure sensor 38 is coupled to any part of the hydraulics in open fluid communication with master cylinder 34.

An electronic control unit (ECU) 40 is provided in vehicle 10. ECU 40 is shown as a single unit in FIG. 1. However, ECU 40 can be a distributed computing system with multiple modules. ECU 40 is provided signals from sensors and provides signals to control various vehicle components. Per the embodiment shown in FIG. 1, ECU 40 is provided with pedals sensors 42 and 44 coupled to brake pedal 26 and an accelerator pedal 46, respectively. Sensors 42 and 44 can be linear sensors detecting an amount of pedal travel, angle sensors detecting an amount of rotation of the pedal, a force sensor or any suitable sensor. In one embodiment, sensor 42 coupled to brake pedal 26 is an on-off sensor indicating when the brake is being depressed, i.e., a brake switch. A brake booster travel switch is another alternative. Air flow to engine 12 is provided through intake manifold 30 and controlled by a throttle valve 48. Throttle valve 48 is controlled by ECU 40, the ECU at least partially basing the command to throttle valve 48 on operator demand, as detected via input to accelerator pedal 46.

Electrical connections shown in FIG. 1 can be, in alternative embodiments, supplanted by wireless communication. ECU 40 is shown coupled to various sensors 60 and various actuators 62. A non-exhaustive list of sensors, which may be coupled to ECU 40 depending on the embodiment, are used to measure engine coolant temperature, ambient air temperature, exhaust gas recirculation (EGR) valve position, exhaust gas oxygen sensor, manifold pressure, engine speed, vehicle speed, wheel speed, brake pedal sensor, vacuum booster signal, etc. A non-exhaustive list of other actuators to which ECU 40 may be providing control signals include: fuel injection pulse width to fuel injectors, EGR valve position, antilock braking, vehicle stability controller, transmission 18, torque converter coupled to transmission 18, etc.

A two-range embodiment of the disclosure is illustrated in FIG. 2 in a graph showing output applied at the wheels as a function of brake input. For purposes of illustration, it is assumed that the accelerator pedal input is constant in FIG. 2. Engine (or powertrain) output is shown as a dash-dot-dot-dash line with two slopes 100 and 102 associated with lower and higher ranges of brake input. In another embodiment, slopes of curves 100 and 102 are equal. In other embodiments, engine output decreases in a non-linear, but monotonically-decreasing, fashion with respect to brake input. At the rightmost portion of curve 102, the engine output is applying a negative output to the engine. When no fuel is supplied to the engine and the engine remains coupled to vehicle wheels, the engine provides a braking output on engine wheels due to pumping and frictional loads. The braking output of the engine does not substantially decrease further, which is illustrated as curve 104. In response to a brake pedal input, according to an embodiment of the disclosure, engine output is caused to decrease in proportion to the brake input even though the accelerator pedal position has not necessarily changed. The engine output achieves its most negative level cannot be decreased further. Also shown, as dashed lines 110 and 112 in FIG. 2, is braking output applied to the wheels in response to input to the brake pedal. In the lower range of the embodiment in FIG. 2, the brakes are very lightly actuated as brake pedal input increases, i.e., a shallow negative slope. In another embodiment, the brakes are prevented from being actuated in the lower range. In the higher range, the brakes are applied to vehicle wheels, providing a negative torque on vehicle wheels. Also shown in FIG. 2, is a solid curve which represents the sum of the outputs provided by the engine and the brake; the sum can be called the resultant output. Curve 120 in the lower range is equal to engine output 100 at no brake pedal input. The two curves diverge slightly as brake pedal input increases with the resultant output being slightly lower than the engine output due to the modest braking output applied. In the higher range, curve 122 shows resultant output having a sharply negative slope as it is the sum of engine output, which is decreasing rapidly, and the braking output (curve 112), which is sloping substantially negatively. At the highest brake inputs, the resultant output is illustrated by curve 124, which is slightly less steep than curve 122. This is due to the drop in engine output being limited to the friction in rotating the engine, i.e., constant curve 104. The modest brake actuation, illustrated as curve 110 in the lower range of FIG. 2, is possible by intervention of ECU 40, similar to how antilock brake systems decrease actual brake actuation from that commanded by the operator as determined from brake pedal input.

A three-range embodiment of the disclosure is illustrated in FIG. 3. The first range is similar to the first range of the embodiment shown in FIG. 2, with curve 150 showing drop in engine output, curve 160 showing a slight negative slope due to a modest application of the brakes, and curve 170 being the resultant output applied at the wheels due to the summing of the impacts of the engine and the brakes. In the second range, the brakes are actuated much more aggressively than in the first range, so that the resultant output 172, as influenced by engine output 152 and braking output 162 is reduced greatly. At the right hand side of the second range, engine output 152 may still be substantially positive and the resultant output applied at the wheels 172 may still be still slightly positive (although in an alternative embodiment with a greater negative output due to braking, it could be negative). In the embodiment of FIG. 3, when the brake pedal input reaches the third range, engine output is immediately commanded to the lowest level possible, as shown by curve 154. Due to manifold emptying and other delays, engine output shows some delay in achieving a negative output (curve 154) and then is constant (curve 156) at higher brake pedal inputs. Consequently, the resultant output is a very sharp drop off, as shown at the left hand side of curve 174. Curve 176 shows continued drop in output, but the continued decrease is due to further brake application.

Examples of output as a function of brake pedal input are shown in FIGS. 2 and 3. However, variations from the specifics of FIGS. 2 and 3 are within the scope of the disclosure. For example, brake application can be delayed until after output provided by the engine drops to zero or even the minimum level such as shown as curve104 in FIG. 2. The slopes of the curves can be altered to provide a linear resultant curve or any other monotonically decreasing relation. The drop off in powertrain (or engine) output can be nonlinear, but does decrease monotonically as a function of brake pedal input. Additionally, the slope of curve 102 is greater than that of 100. However, in an alternative embodiment, they are equal.

In one embodiment, a baseline output is determined based on the input to the accelerator pedal (API). That is, the operator's input is used to compute a baseline output, T baseline, for the engine to develop. When the operator is also depressing the brake, in one embodiment, it is presumed that the operator is requesting a decrease in output from the baseline level. Such decrease in output, T decrease, depends on the magnitude of the brake input (BPI). Output commanded to the engine, T_commanded, is:

$$T\_commanded\ (API, BPI) = T\_baseline\ (API) - T\_decrease\ (BPI)$$

where T_baseline is determined independently of brake pedal input and T_decrease is determined independently of accelerator input, with the output commanded to the engine being a function of both inputs.

In FIG. 4, a flowchart illustrating an embodiment of the disclosure is shown starting at 200. In block 202, it is determined whether the brake and accelerator pedals are being simultaneously actuated. Control passes back to block 202 until a positive result in 202 causes control to pass to block 204 in which engine output is decreased in relation to the amount that the brake pedal is actuated. While control continues between blocks 202 and 204, the engine is controlled via another algorithm that is outside the present disclosure. In 206, it is determined whether brake pedal actuation is in a first or second range. If in the first range, control passes back to block 204. If in the second range, control passes to 208 in which the engine output continues to decrease in relation to brake pedal actuation. When engine output is at its minimum, no more output reduction may occur. Additionally, in block 208, output is further reduced by applying a braking force at vehicle wheels. Control passes back to 206 to determine whether the brake pedal is within the first or second range. Not shown in the synchronous algorithm depicted in FIG. 4, however, if the brake and accelerator pedals are no longer simultaneously actuated, the algorithm of FIG. 4 is interrupted and control passed back to 202.

In FIG. 5, a flowchart of one example of the three-range embodiment starts in 250. In 252, it is determined whether the brake and accelerator pedals are simultaneously depressed. The flowchart proceeds no further unless a positive result in 252 which passes control to 254 in which the engine output is decreased in relation to the magnitude of the brake pedal input and the brakes are prevented from actuating, i.e., the first range actions are taken because the pedal is at least depressed enough to be considered in the first range. As described above in regard to FIG. 3, in an alternative embodiment, the brakes are actuated a very modest amount. Either embodiment, no brake actuation or modest brake actuation, is within the scope of the disclosure. In block 256, it is determined whether the brake pedal is in the first or second range. Control passes back to block 254 to continue the first range actions if first range and control passes to block to initiate second range actions: decrease engine output in relation to magnitude of the brake pedal actuation and actuate the brakes. The decreasing engine output in relation to increasing brake pedal actuation can be the same in blocks 254 and 258 or different, such as shown in FIG. 3 in which the engine output is decreased more sharply in the second range. Control passes from block 258 to block 260 to determine which range the brake pedal is in. If the first range, control passes to block 254; if the second range, control passes to block 258; and if the third range, control passes to block 262 in which engine output is dropped to its minimum level possible, if not already there; and brakes are actuated. From block 262, control passes back to block 260, to determine the current range of the brake pedal input. If the brake pedal is no longer being actuated, control is passed directly to block 252.

In the description above, reference has been made to engine output and braking output. Output is used to serve as a generic term, which refers to power, torque, brake mean effective pressure (BMEP), propulsive force or any quantity of combination thereof which refers to providing output, either positive (for propulsion) or negative (for braking), at the vehicle wheels. Furthermore, the description above refers to an engine, which in some embodiments is an internal combustion engine provided as the vehicle's sole propulsion device. However, in vehicles which are further equipped with at least one electric motor, commonly referred to as hybrid electric vehicles, decreasing the output of the powertrain, i.e., the sum of that provided by the engine and the electric motor(s), is what is meant by decreasing output. The term powertrain, herein, refers to the devices coupled to vehicle wheels that are capable of propelling the vehicle. Furthermore, in the description above, reference is made to an operator depressing an accelerator pedal and depressing a brake pedal. However, alternatively, one or both of the pedals are inadvertently depressed by another passenger or an object in the vehicle such as a carpet or something falling into the pedal area. Additionally, a pedal may stick at a depressed position. Any of these scenarios which lead to the controller receiving sensor signals indicating that both pedals are depressed simultaneously are within the scope of the present disclosure.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the state of vehicle accessories. However, to maintain a desirable cost structure, a satisfactory estimation of some accessory quantities may be ascertained by inferring from a lesser set of sensor data. The embodiments described as being less desirable relative to other embodiments with respect to one or more characteristics are not outside the scope of the disclosure as claimed.

What is claimed:

1. A computer-implemented method of controlling a vehicle powertrain, comprising:
    detecting a condition when a brake input and an accelerator input occur simultaneously;
    determining a magnitude of the brake input; and
    commanding the powertrain to decrease engine torque output directly proportional to the magnitude of the brake input when the condition is detected, wherein the step of commanding includes determining a baseline output, which is a function of a magnitude of the accelerator input, and subtracting a decrease in output, which is a function of the magnitude of the brake input;
    wherein the magnitude of the brake input can be characterized according to a lower range and a higher range;
    wherein when the magnitude of the brake input is in the lower range commanding the powertrain to decrease output according to a first relationship; and
    wherein when the magnitude of the brake input is in the higher range commanding the powertrain to decrease output according to a second relationship.

2. The method of claim 1, further comprising:
    applying a vehicle brake when the magnitude of the brake input is in the higher range.

3. The method of claim 1, wherein the determining the magnitude of the brake input is based on a signal from at least one of: a pressure sensor in a hydraulic system coupled to brakes, a brake pedal angle sensor, a linear pedal travel sensor, a brake pedal force sensor, and a brake booster travel sensor.

4. A system for controlling engine torque output provided to wheels of an automotive vehicle, comprising:
    a powertrain coupled to at least one axle of the vehicle;
    brakes coupled to vehicle wheels;
    a brake pedal coupled to the vehicle and the brakes;
    a brake sensor providing a signal indicating a magnitude of brake pedal input;
    an accelerator pedal coupled to the vehicle;
    an accelerator pedal sensor coupled to the accelerator pedal; and
    an electronic control unit (ECU) electronically coupled to the powertrain, the brake sensor, and the accelerator pedal sensor;
    wherein the ECU is configured to determine whether the brake pedal and accelerator pedal are simultaneously actuated;
    wherein when the ECU determines simultaneous actuation of the brake pedal and accelerator pedal the ECU is configured to decrease engine torque output according to a first relationship for brake input in a lower range of brake input and according to a second relationship for brake input in a higher range of brake input.

5. The system of claim 4, wherein the ECU is configured to allow the brakes to actuate when the brake input is in the higher range.

6. The system of claim 4, wherein the brake sensor comprises a pressure sensor associated with a master cylinder coupled to the brakes and the pressure sensor substantially measures pressure in the master cylinder.

7. The system of claim 4, wherein the brake sensor is coupled to the brake pedal, the brake sensor configured to detect one of a brake pedal angle, a brake pedal linear depression, a force on the brake pedal, or brake booster travel.

8. The system of claim 4, wherein the ECU is configured to decrease engine torque output supplied when a vehicle speed is greater than a threshold speed.

9. A computer-implemented method of controlling a vehicle having a powertrain, comprising:
    detecting a magnitude of a brake pedal input;
    detecting a magnitude of an accelerator pedal input;
    decreasing an output supplied by the powertrain directly proportional to the magnitude of brake pedal input while the accelerator pedal and the brake pedal are simultaneously actuated;
    minimizing brake actuation on wheels coupled to the vehicle the magnitude of the brake pedal input is in a first range; and
    allowing brakes to actuate on wheels coupled to the vehicle when the magnitude of the brake pedal input is in a second range.

10. The method of claim 9, further comprising:
    transitioning between the second range and a third range based on one of:
    (i) powertrain output exceeding a second output threshold; or (ii) brake pedal input exceeding a second brake pedal input threshold.

11. The method of claim 10, further comprising:
    commanding powertrain output to a lowest level and allowing brakes to actuate when the magnitude of the brake pedal input is in the third range.

12. The method of claim 9, wherein the detecting a magnitude of a brake pedal input is based on at least one of brake pedal travel, brake pedal angle, brake pedal force, brake booster travel, or pressure in a master cylinder coupled to a brake system.

13. The method of claim 9, further comprising:
    decreasing powertrain output in a first range at a lesser rate than decreasing powertrain output in a second range.

14. The method of claim 9, wherein the minimizing brake actuation comprises preventing brake actuation.

15. A computer-implemented method of controlling a vehicle powertrain, comprising:
    determining whether brake and an accelerator pedals are applied simultaneously; and
    when the brake and accelerator pedals are applied simultaneously, reducing engine torque output as a directly proportional function of brake pedal depression, including decreasing engine torque by
        a first multiplier that correlates to a first magnitude of brake pedal depression and
        a second multiplier that correlates to a second magnitude of brake pedal depression.

* * * * *